(12) United States Patent
Tsuchizaki

(10) Patent No.: US 7,185,451 B2
(45) Date of Patent: Mar. 6, 2007

(54) LICENSE PLATE HOLDING BRACKET AND THE HOLDING STRUCTURE THEREOF

(75) Inventor: Akihiro Tsuchizaki, Gunma (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 386 days.

(21) Appl. No.: 10/663,107

(22) Filed: Sep. 16, 2003

(65) Prior Publication Data

US 2004/0089776 A1    May 13, 2004

(30) Foreign Application Priority Data

| Sep. 17, 2002 | (JP) | 2002-270020 |
| Sep. 17, 2002 | (JP) | 2002-270040 |
| Sep. 17, 2002 | (JP) | 2002-270044 |
| Sep. 17, 2002 | (JP) | 2002-270109 |
| Sep. 17, 2002 | (JP) | 2002-270116 |

(51) Int. Cl.
*G09F 13/16* (2006.01)

(52) U.S. Cl. .......................... 40/211; 40/209

(58) Field of Classification Search ........... 248/249.11, 248/222.11, 221.11, 444.1; 40/209, 210, 40/211, 201, 200; 296/1.01, 57.1, 50, 53, 296/57.7
See application file for complete search history.

(56) References Cited

U.S. PATENT DOCUMENTS

| 1,250,543 | A | * | 12/1917 | Bartolomeo | 40/201 |
| 1,259,555 | A | * | 3/1918 | Reilly | 40/211 |
| 1,573,113 | A | * | 2/1926 | Irie | 40/201 |
| 2,173,134 | A | | 9/1939 | Vokaty | |
| 2,791,046 | A | * | 5/1957 | Goldberg | 40/209 |
| 2,803,810 | A | * | 8/1957 | Evans et al. | 340/426.1 |
| 3,274,723 | A | * | 9/1966 | Jacobs | 40/209 |
| 4,270,287 | A | * | 6/1981 | Gimbel | 40/718 |
| 4,302,896 | A | * | 12/1981 | Bott | 40/209 |
| 6,338,519 | B2 | * | 1/2002 | Decker et al. | 296/57.1 |
| 6,796,060 | B1 | * | 9/2004 | Meester et al. | 40/210 |
| 2003/0127879 | A1 | * | 7/2003 | Smith | 296/57.1 |

FOREIGN PATENT DOCUMENTS

| DE | 1 804 607 | 1/1960 |
| DE | 198 14 843 A1 | 10/1998 |

(Continued)

*Primary Examiner*—Amy J. Sterling
(74) *Attorney, Agent, or Firm*—Smith, Gambrell & Russell, LLP

(57) ABSTRACT

A license plate holding bracket attached to a tailgate which is arranged at a rear end of a cargo bed of a vehicle to perform a reciprocal rotational movement and which sets up the cargo bed in a closed state when the tailgate is in a vertical state and sets up the bed in an opened state when the tailgate is in a horizontal state. The bracket has a gate side fixing member fixed to the tailgate, a plate holding member for holding a license plate and a rotational movement mechanism for connecting the plate holding member to the gate side fixing member to make the plate holding member freely perform a reciprocal rotational movement and for moving the plate holding member to make the license plate take a parallel state or a erecting state to the tailgate so as to be visible of the license plate even though the plate is in the horizontal state.

9 Claims, 13 Drawing Sheets

FOREIGN PATENT DOCUMENTS

| | | |
|---|---|---|
| DE | 100 17 520 A1 | 10/2001 |
| EP | 0 143 076 A2 | 5/1985 |
| FR | 1 188 968 A | 9/1959 |
| JP | 10-230799 | 9/1998 |
| JP | 204182152 * | 7/2004 |
| JP | 2004182152 * | 7/2004 |

* cited by examiner

LICENSE PLATE HOLDING BRACKET AND THE HOLDING STRUCTURE THEREOF

BACKGROUND OF THE INVENTION

1. Field of the Invention

The present invention relates to a license plate holding bracket attached to a vehicle which has a tailgate at a rear end of a bed, and a license plate holding structure thereof.

2. Description of Related Art

Generally, a license plate is normally attached to a rear bumper placed at a lower position of a cargo bed of a vehicle which has a tailgate at the rear end of the cargo bed. In a license plate holding structure of this type of the vehicle, generally, an attachment surface of the license plate is formed on a rear bumper, and the license plate is directly attached to the rear bumper. For example, such a structure is disclosed in Unexamined Japanese Patent Publication No. Tokukai-hei-10 (1998)-230799 (Patent Document 1), in particular, in page 4 of the specification, and in FIG. 1.

Assuming that the license plate can be attached to the tailgate, a design freedom in shaping the vehicle can be considerably improved. However, in a case that the license plate is directly attached to the tailgate in the same manner as the above described license plate holding structure, when the tailgate is set in an almost horizontal state, a problem arises that the license plate cannot be seen or recognized from the rear of the vehicle (for example, refer to Patent Document 1).

In order to solve the problem, there is an idea that the license plate is attached to the tailgate so that a reciprocal rotational movement of the license plate relative to the tailgate can be freely performed, and the license plate is reciprocally rotated relative to the tailgate when the tailgate is set in the almost horizontal state. According to this idea, the license plate can be seen and recognized from the rear.

However, regardless of whether the tailgate is set in an almost horizontal state or an almost vertical state, it is difficult to reliably support the license plate, and another problem may arise that a vibration or the like occurring in the license plate cannot be suppressed.

Further, when the license plate is placed in the vicinity of the tailgate, the member in the side of the license plate becomes very close to the member in the side of the tailgate. Therefore, an operator cannot insert his or her fingers between the member in the side of the license plate and the member in the side of the tailgate, so that he or she cannot grasp nor hold the member in the side of the license plate. Therefore, there is a probability that it becomes difficult to perform the reciprocal rotational operation for the member in the side of the license plate.

Because a hand of the operator tends to touch an exposed portion of the member of the license plate, or dust stirred up by rear tires tends to adhere to the exposed portion, a problem arises that the exposed portion is damaged and worn away. Further, when the member holding the license plate is made from a metal, a problem that the member tends to become rusty, arises.

When welding nuts are used to fasten the license plate to a bracket, it is required to set the member of the license plate away from the member of the tailgate by a setting space of the welding nuts. Therefore, it requires a large sized bracket.

When the license plate is set to erect on the tailgate, it is difficult to fix a side of the license plate reliably, and thereby the strength and durability of the license plate may be decreased. Therefore, there is a large possibility that the license plate is fallen away or detached from the tailgate while the vehicle is running.

SUMMARY OF THE INVENTION

In order to solve the above problem, an object of the present invention is to provide a license plate holding bracket which can attach a license plate to a tailgate of a vehicle so as to be able to see and recognize the license plate from the rear of the vehicle regardless of whether the tailgate is set in an almost vertical state or an almost horizontal state. Another object of the present invention is to provide a license plate holding structure of the vehicle having such a license plate holding bracket.

In order to accomplish the above described object, in accordance with the first aspect of the present invention, the license plate holding bracket attached to a tailgate which is arranged at a rear end of a cargo bed of a vehicle to perform a reciprocal rotational movement and which sets up the cargo bed in a closed state when the tailgate is in an almost vertical state and sets up the cargo bed in an opened state when the tailgate is in an almost horizontal state, comprising: a gate side fixing member fixed to the tailgate; a plate holding member for holding a license plate; and a rotational movement mechanism for connecting the plate holding member to the gate side fixing member to make the plate holding member freely perform a reciprocal rotational movement and for moving the plate holding member so as to set the license plate in an almost parallel state or an almost erecting state to the tailgate.

According to the first aspect of the present invention, the plate holding member further has a stopper which contacts a rear bumper of the vehicle when the tailgate is in an almost horizontal state and the license plate almost erects on the tailgate. Therefore, the license plate can be seen and recognized from the rear of the vehicle.

According to the second aspect of the present invention, when the tailgate is set in the almost horizontal state, the plate holding member is positioned to make the license plate be almost erected on (almost perpendicular to) the tailgate. Therefore, because the license plate protrudes downwardly from the tailgate which is set in the almost horizontal state, the license plate can be seen and recognized from the rear. At this time, the stopper of the plate holding member contacts the rear bumper.

Accordingly, regardless of whether the tailgate is set in the almost vertical or horizontal state, the license plate can be seen and recognized from the rear. Therefore, even though the cargo bed is set in the open state, because the license plate can be seen and recognized from the rear, the vehicle can be run without any trouble, and the bracket is considerably advantageous for practical use.

In case of the tailgate set in the almost horizontal state, when the license plate almost erects on the tailgate, the stopper of the plate holding member contacts the rear bumper. Therefore, the plate holding member and the license plate are securely supported by the rear bumper, and the vibration of the license plate can be suppressed. In short, when the tailgate is set in the almost horizontal state, the vibration of the license plate can be suppressed. Therefore, the reliability and durability of bracket members can be secured, and a rattle of the bracket can be suppressed.

Because the license plate can be attached to the tailgate, also a design freedom in shaping the vehicle can be considerably improved, and the sales performance of the vehicle can be improved.

In the license plate holding bracket according to the second aspect of the invention, the stopper may contact the tailgate when the license plate is almost in parallel with the tailgate.

The stopper may contact the gate side fixing member when the license plate is almost in parallel with the tailgate.

According to the license plate holding bracket having the above described structure, in addition to the above described function, when the license plate is almost in parallel with the tailgate, the stopper of the plate holding member contacts the tailgate or the gate side fixing member.

Accordingly, when the license plate is almost in parallel with the tailgate, because the stopper of the plate holding member contacts the tailgate or the gate side fixing member, the plate holding member and the license plate can be securely supported by the tailgate, and thereby the vibration of the license plate can be suppressed. That is, regardless of whether the tailgate is set in either of the almost vertical or horizontal state, the vibration of the license plate can be suppressed. Also, the reliability and durability of the bracket members can be secured, and a rattle of the bracket can be suppressed.

Further, when the tailgate is set in the almost vertical state, the stopper contacts the tailgate or the gate side fixing member. When the tailgate is set in the almost horizontal state, the stopper contacts the rear bumper. Therefore, it is not required to separately prepare stoppers to correspond to open or closed state of the tailgate. As a result, the number of members can be reduced to decrease the manufacturing costs for making the license plate holding bracket.

It is preferable that the stopper is made of elastic material.

Accordingly, because the stopper is made of elastic material, the relative movement of the plate holding member to the tailgate or the rear bumper, caused by the vibration of the vehicle while running can be absorbed by the expansion and contraction of the stopper. That is, the plate holding member can securely follow the movement of the tailgate or the rear bumper while the vehicle is running.

Accordingly, there is little probability that the plate holding member and the license plate flap against the tailgate or the rear bumper while running. Further, the reliability and durability of every parts of the bracket can be further improved, and a rattle of the bracket can be effectively suppressed.

Each of the gate side fixing member and the plate holding member may have a plate shape, and an end side of the plate holding member in a predetermined direction may be connected to the gate side fixing member to make the plate holding member perform a reciprocal rotational movement.

According to the structure, in addition to the above described function, when the plate holding member is rotationally movable relatively to the gate side fixing member for making the other end of the plate holding member in a predetermined direction approach the gate side fixing member and the bracket is folded, the license plate becomes almost parallel with the tailgate.

When the plate holding member is rotationally moved relatively to the gate side fixing member for making the other end of the plate holding member in the predetermined direction move away from the gate side fixing member and the plate holding member is protruded from the tailgate, the license plate comes almost to erect on the tailgate.

Accordingly, when the tailgate set in the almost vertical state is used, because the combination of the gate side fixing member and the plate holding member is folded, the whole bracket can be thinned, in order to allow an advantageous layout for the bracket. When the tailgate is set in the almost horizontal state, the license plate can be protruded downwardly from the tailgate comparatively largely, and the visibility and performance recognition ability of the license plate can be improved.

In accordance with the third aspect of the present invention, in addition to the structure of the first aspect of the invention, the license plate holding bracket further comprises a lock mechanism for locking the gate side fixing member and the plate holding member when the license plate is almost in parallel with the tailgate. And the rotational movement mechanism comprises: a stay, of which a first end is attached to the gate side fixing member for performing a reciprocal rotational movement; a groove formed in a member along the plate holding member, a pin arranged on a side of a second end of the stay inserted in the groove; and a pin engaging member for engaging with the pin when the plate holding member almost erects, wherein the plate holding member is supported by the stay when the plate holding member almost erects on the gate side fixing member.

According to the third aspect of the present invention, when the tailgate is set in the almost vertical state, the plate holding member is positioned to make the license plate be in parallel with the tailgate. Thereby, the license plate can be seen and recognized from the rear of the vehicle.

In this state, the gate side fixing member and the plate holding member are locked by the lock mechanism. Because the plate holding member is in parallel with and close to the gate side fixing member, the whole bracket comes to be in a folded state. Further, because a side of the plate holding member, in which the groove is formed, becomes close to the gate side fixing member, the pin becomes close to the gate side fixing member. As a result, both one end and the other end of the stay approach the gate side fixing member, and the stay becomes in parallel with the gate side fixing member.

When the tailgate is set in the horizontal state, the plate holding member is placed to make the license plate erect on the tailgate. In short, because the license plate protrudes downwardly from the tailgate which is set in an almost horizontal state, the license plate can be seen and recognized from the rear of the vehicle.

In the state, because the plate holding member with a member having the groove formed therein erects on the gate side fixing member, the pin is placed to be away from the gate side fixing member. As a result, the other end of the stay is moved away from the gate side fixing member, and the stay supports the plate holding member while holding a predetermined angle between the stay and the gate side fixing member. Further, in this case, because the pin engages with the pin engaging member, the stay is fixed and the gate side fixing member and the plate holding member are locked together.

Accordingly, regardless of whether the tailgate is set in the almost vertical or horizontal state, the license plate can be seen and recognized from the rear of the vehicle. That is, even though the cargo bed is maintained in an open state, the license plate can be seen and recognized from the rear. Therefore, the vehicle can be run without any trouble, and the bracket is considerably advantageous for practical use.

In the state that the license plate is almost in parallel with the tailgate, the whole bracket can be folded while the gate side fixing member, the plate holding member and the stay are set to be almost in parallel with one another. There is no possibility that the bracket and the license plate largely protrude from the tailgate. Therefore, a good appearance of the vehicle can be maintained, and the bracket is considerably advantageous for practical use.

In the state that the license plate almost erects on the tailgate, the stay supports the plate holding member while holding the predetermined angle between the stay and the gate side fixing member. Therefore, a load exerted on the plate holding member and the license plate can be efficiently received by the stay and the gate side fixing member, and the license plate can be reliably fixed.

Because the stay is fixed by arranging the pin engaging member, the gate side fixing member and the plate holding member are securely fixed to each other, and there is little probability that the plate holding member and the license plate flap while the vehicle is running. Therefore, the reliability and durability of the bracket members can be further improved, and a rattle of the bracket can be efficiently suppressed.

In the license plate holding bracket according to the third aspect of the present invention, the rotational movement mechanism may have a structure in which the pin is placed at the first end of the groove when the plate holding member is almost in parallel with the gate side fixing member and the pin is placed at the second end of the groove when the plate holding member almost erects on the gate side fixing member, and the stay may perform a reciprocal rotational movement from a state in which the stay is almost in parallel with the gate side fixing member with an angle exceeding 90 degrees when the plate holding member almost erects on the gate side fixing member, and the second end of the groove may be formed to be bent toward a center of the rotational movement of the stay.

According to such a structure, in addition to the above described function, when the license plate erects on the tailgate, the stay is rotationally moved with the angle exceeding almost 90 degrees. Therefore, the amount of the rotational movement of the stay relative to the gate side fixing member is larger than that of the plate holding member, and the stay supports the plate holding member at a comparatively small angle with the plate holding member in the direction of the reciprocal rotational movement of the plate holding member. Therefore, the load applied from the plate holding member in the direction of the reciprocal rotational movement can be received by the stay in a direction pressing the stay.

When the license plate erected on the tailgate is rotationally moved to obtain the state of the license plate being almost in parallel with the tailgate, until the stay becomes vertical to the gate side fixing member, the pin moves to be away from the gate side fixing member. Because the second end of the groove is formed to be bent toward the center of the rotational movement of the stay, the load applied from the pin to the groove portion can be released in a direction opposite to the direction of the rotational movement.

Accordingly, because the load applied to the plate holding member in the direction of the rotational movement in the state that the plate holding member erects is received by the stay in the direction to press the stay, the rotational movement of the plate holding member can be reliably and effectively interrupted. Because the load applied to the pin and to the groove of the member at the starting time of the rotational movement is also reduced, the deformation of each member can be prevented. In addition, because the force required for the reciprocal rotational movement of the plate holding member is reduced, the operability of the reciprocal and rotational movement can be considerably improved.

In the license plate holding bracket of the first, second or third aspect of the invention, it is preferable that the license plate is almost in parallel with the tailgate by placing the other end side of the plate holding member in the predetermined direction to be close to the gate side fixing member, and the license plate erects on the tailgate by placing the other end side of the plate holding member in the predetermined direction to be away from the gate side fixing member, the bracket further comprises: a lock mechanism for locking the gate side fixing member and the plate holding member when the license plate is almost in parallel with the tailgate, the lock mechanism having a latch arranged on the plate holding member and a striker arranged on the gate side fixing member for being freely engageable with and detachable from the latch; and a biasing member for exerting a biasing force on the gate side fixing member and the plate holding member, when the gate side fixing member and the plate holding member are locked by the lock mechanism for being easily separatable from the gate side fixing member and the plate holding member from each other.

According to the license plate holding bracket having such a structure, when the tailgate is set in an almost vertical state, the plate holding member is placed to make the license plate be almost in parallel with the tailgate. Thereby, the license plate can be seen and recognized from the rear of the vehicle. In this case, the gate side fixing member and the plate holding member are locked together with the lock mechanism, and the plate holding member and the license plate are securely fixed to the tailgate. Because a biasing force is exerted on the gate side fixing member and the plate holding member to separate the gate side fixing member and the plate holding member from each other, the plate holding member and the license plate can be fixed with little rattle and noise.

When the tailgate is set in the almost horizontal state, the plate holding member is placed to make the license plate almost erect on the tailgate. Therefore, because the license plate protrudes downwardly from the tailgate which is set in the almost horizontal state, the license plate can be seen and recognized from the rear of the vehicle.

Next, operating steps for changing the tailgate from the vertical state to the horizontal state will be described. An operator releases the lock of the gate side fixing member and the plate holding member performed by the lock mechanism. In this case, because the biasing member exerts a biasing force on the gate side fixing member and the plate holding member to separate them from each other, the other end (hereinafter, simply called the other end) of the plate holding member in the predetermined direction rises from the gate side fixing member. Therefore, an open space is formed between the gate side fixing member and the plate holding member, and thereby the operator can hold the plate holding member by inserting his or her fingers in the open space. Thereafter, the operator rotationally moves the plate holding member with respect to the gate side fixing member while holding the other end side of the plate holding member, and the operator sets the license plate to be in an almost erected state on the tailgate. Then, the operator sets the tailgate to be in an almost horizontal state. As a result, the license plate protrudes downwardly from the tailgate.

In order to change the tailgate from the horizontal state to the vertical state, the tailgate is set to the almost vertical state, and then the other end of the plate holding member is rotationally moved to approach the gate side fixing member, and the gate side fixing member and the plate holding member are locked by the lock mechanism. Accordingly, the license plate becomes being almost in parallel with the tailgate.

Accordingly, the license plate can be seen and recognized from the rear of the vehicle regardless of whether the tailgate is set in the vertical or horizontal state. That is, even though the cargo bed of the vehicle is open, the license plate can be seen and recognized from the rear of the vehicle. Therefore, the vehicle can be run without any trouble, and the license plate holding bracket is advantageous for practical use.

When the lock of the gate side fixing member and the plate holding member is released, the plate holding member rises with respect to the gate side fixing member. Therefore, the operator can easily and reliably perform the reciprocal rotational movement of the plate holding member.

Because the gate side fixing member and the plate holding member are securely fixed to each other without being shaken, the vibration of the license plate can be suppressed, the reliability and durability of each member of the bracket can be secured, and the rattle of the bracket can be suppressed.

Further, because the gate side fixing member and the plate holding member are locked by engaging the latch and the striker, each member can be reliably fixed.

When the striker engages with the latch, the load is exerted on an attachment portion of the striker. However, because the striker is arranged on the gate side fixing member fixed to the tailgate, this load can be received in the side of the tailgate.

Accordingly, the gate side fixing member and the plate holding member can be further reliably locked, and an occurrence of a lock failure caused by the vibration of the running vehicle can be reliably avoided.

Because the load exerted on the striker is received in the side of the tailgate, no excessive load is exerted on each member of the bracket, and the bracket is considerably advantageous in strength for rigidity.

The above described license plate holding bracket may further comprise a resin member for covering a surface of the plate holding member in a side of the gate side fixing member.

In the license plate holding bracket of the above described structure, when the operator rotationally moves the license plate, the operator grasps and holds the end of the plate holding member, Because the end of the plate holding member is covered with the resin member, no exposed portions of the plate holding member are directly touched with the operator's fingers. The amount of the dust which is stirred up by rear tires and then directly attach or adhere to the plate holding member, can be reduced.

Further, his or her fingers or the dust stirred up by rear tires, do not attach to the end of the plate holding member, the exposed portions can be reliably protected, and a tipping sound of the running vehicle can be reliably reduced. Because the operator does not directly grasp nor hold the exposed portions of the plate holding member but can perform the reciprocal rotational movement while grasping and holding the resin member, it is easy to hold the plate holding member securely by grasping the resin member by his or her hand. Because the operator does not directly touch the end of the plate holding member, the safety of the bracket can be considerably improved.

When the license plate protrudes downwardly from the tailgate which is set in the almost horizontal state, the dust stirred up by rear tires easily attaches to the front surface of the plate holding member. However, because the front surface of the plate holding member is covered with the resin member, the amount of the dust directly attaching to the exposed portions of the plate holding member, after being stirred up by the rear tires can be reduced.

Accordingly, the exposed portions of the plate holding member can be effectively protected, and the tipping sound can be effectively reduced. Particularly, when the lower end of the plate holding member protrudes downwardly to the lower portion of the bumper, a large amount of the dust is reliably flown toward the front lower end of the plate holding member. Therefore, a large rust preventive effect and a large tipping sound preventive effect can be obtained.

In the license plate holding bracket, preferably, a hole is formed in the plate holding member, a hook is formed in the resin member to engage with a periphery of the hole, and the resin member freely engages with and is detached from the plate holding member.

According to such a structure, in addition to the above described function, because the hook engages with the periphery of the hole holding member, the resin member is fixed to the plate holding member. That is, the resin member engages with the end of the plate holding member, and the hook is hooked on the periphery of the hole. Therefore, the movement of the resin member to the end of the plate holding member is restricted.

Accordingly, the resin member can reliably engage with and be fixed to the plate holding member by using a simple structure. Further, the engagement of the hook and the periphery of the hole can be easily released, and the resin member can be easily detached from the plate holding member.

The license plate holding bracket may further comprise a fixing member arranged to freely engage with and be detached from the plate holding member for engaging with and fixing the resin member.

According to such a structure, in addition to the above described function, the resin member can be reliably fixed to the plate holding member by the fixing member.

Accordingly, the resin member can be reliably fixed to the plate holding member, and it is effectively prevented that the license plate is fallen away from the tailgate when the vehicle is running.

The fixing member may be brought into contact with the tailgate when the license plate is almost in parallel with the tailgate.

According to such a structure, in addition to the above described function, when the license plate is almost in parallel with the tailgate, the fixing member contacts the tailgate.

Accordingly, when the license plate is almost in parallel with the tailgate, the fixing member of the plate holding member contacts the tailgate. Therefore, the plate holding member and the license plate are securely supported by the tailgate, and the vibration of the license plate can be suppressed. In short, when the tailgate is set in the almost vertical state, the vibration of the license plate can be suppressed, the reliability and durability of each member can be secured, and a rattle of the bracket can be suppressed.

The license plate holding bracket may further comprise: a welded bolt arranged in the plate holding member for inserting through a holding hole formed in the license plate; and a nut screwed on the bolt.

In the license plate holding bracket of the above described structure, the license plate is fastened to the side of the bracket by screwing the nut on the bolt. Here, the head of the bolt protrudes from the plate holding member in the direction of the gate side fixing member, and a protruding height H1 of the head is lower than that H2 of the nut.

When the license plate is attached to the bracket, the operator positions the license plate by inserting the bolt into the holding hole of the license plate, and the operator screws the nut on the bolt.

Accordingly, regardless of whether the tailgate is set in the almost vertical or horizontal state, the license plate can be seen and recognized from the rear of the vehicle. That is, even though the cargo bed of the vehicle is open, the license plate can be seen and recognized from the rear of the vehicle. Therefore, the vehicle can be run without any trouble, and the license plate holding bracket is advantageous for practical use.

Further, the amount of the protrusion of the bolt protruding from the plate holding member in the direction of the gate side fixing member is smaller than that of the nut. Therefore, the interference of the gate side fixing member and the head of the nut can be comparatively easily prevented. In short, the plate holding member can be set to be placed comparatively close to the gate side fixing member, and the whole bracket can be manufactured in a small size.

When the license plate is attached to the bracket, the operator inserts the bolt into the holding hole, and the operator can fasten the nut while the license plate engages with and is fixed to the plate holding member. That is, the license plate can be attached to the bracket without supporting the license plate with the operator's hand, a jig or the like, and an installation work of attaching the license plate can be improved.

In accordance with the fourth aspect of the present invention, the license plate holding structure of the vehicle, comprises: the tailgate which is arranged at the rear end of the cargo bed of the vehicle, for setting up the cargo bed in a closed state when the tailgate is in the almost vertical state and setting up the bed in the opened state when the tailgate is in the almost horizontal state; a gate side fixing member fixed to the tailgate; a plate holding member holding a license plate; and a rotational movement mechanism for connecting the plate holding member to the gate side fixing member to make the plate holding member freely perform a reciprocal rotational movement and for moving the plate holding member to make the license plate take an almost parallel state or an almost standing state, to the tailgate, the plate holding member having a stopper which contacts a rear bumper of the vehicle when the tailgate is in an almost horizontal state and the license plate almost erects on the tailgate, wherein a receiving cavity for receiving the stopper is formed in the tailgate to face the license plate holding bracket.

According to the license plate holding structure of the vehicle, when the license plate is almost in parallel with the tailgate, the stopper is received in the receiving cavity of the tailgate. As a result, the plate holding member can be set to a position close to the tailgate without considering the size of the stopper.

Accordingly, the license plate holding bracket can be installed at a position close to the tailgate and there is little probability that the bracket and the license plate largely protrude from the tailgate. Therefore, the structure can be advantageous for practical use without loss of appearance.

BRIEF DESCRIPTION OF THE DRAWINGS

The present invention will become more fully understood from detailed descriptions given hereinbelow and accompanying drawings given by an illustration only, and thus are not intended as a definition of the limits of the present invention, and wherein.

PREFERRED EMBODIMENTS OF THE INVENTION

Figure 1:
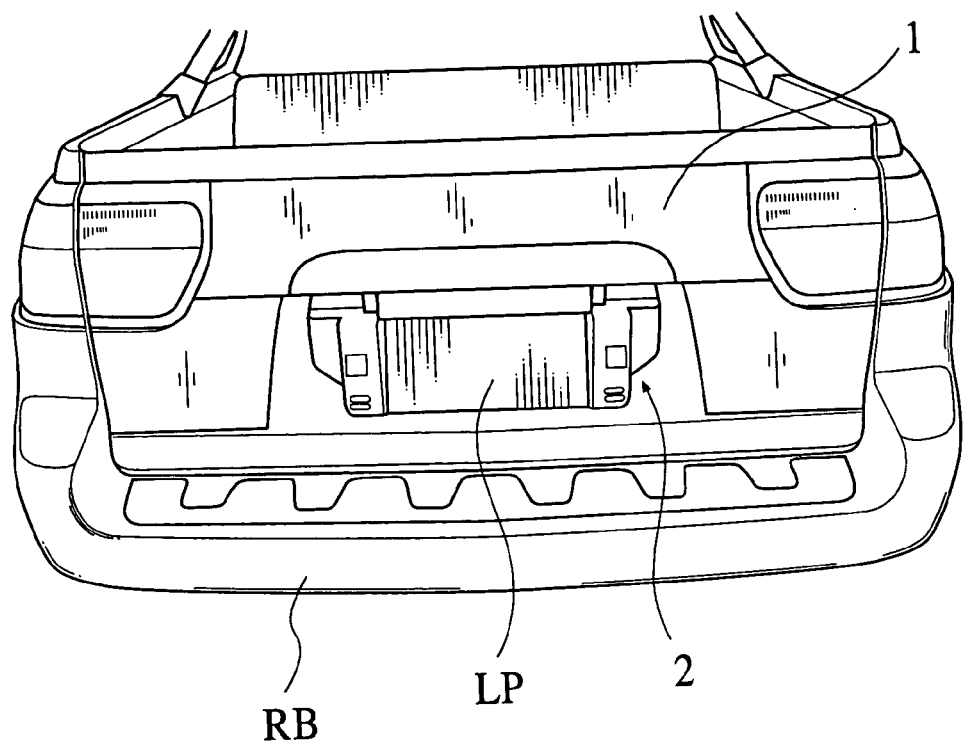
FIG. 1 shows an embodiment and is a back view of a vehicle of which a tailgate is in an almost vertical state.
Figure 2:
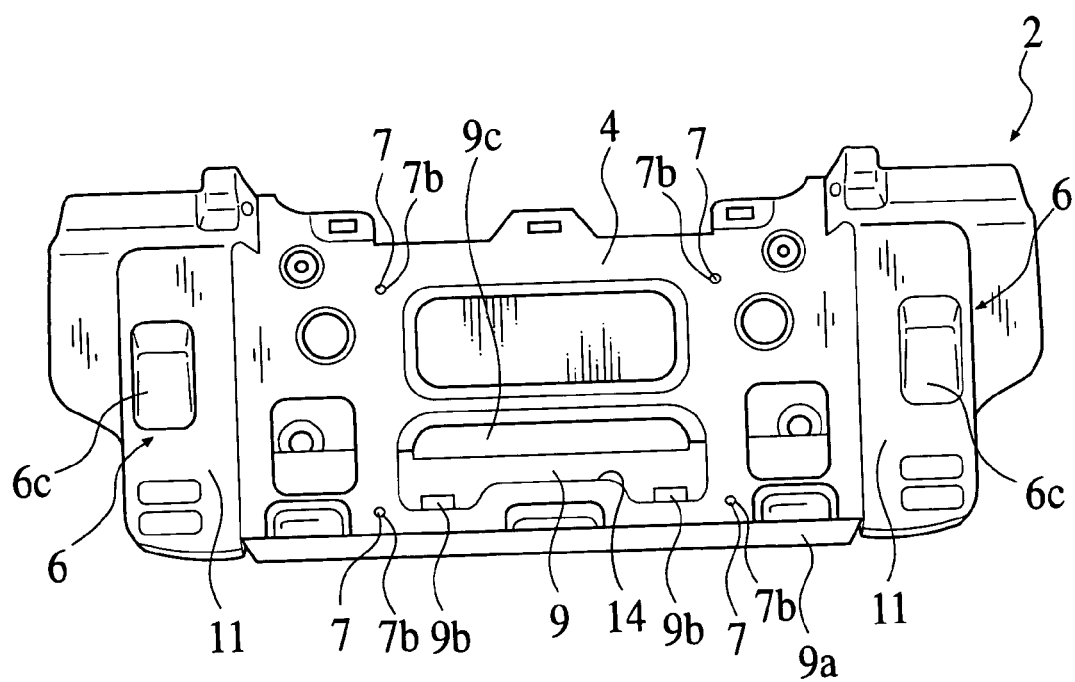
FIG. 2 is the back view of the license plate holding bracket in which the plate holding member is almost in parallel with the gate side fixing member.
Figure 3:
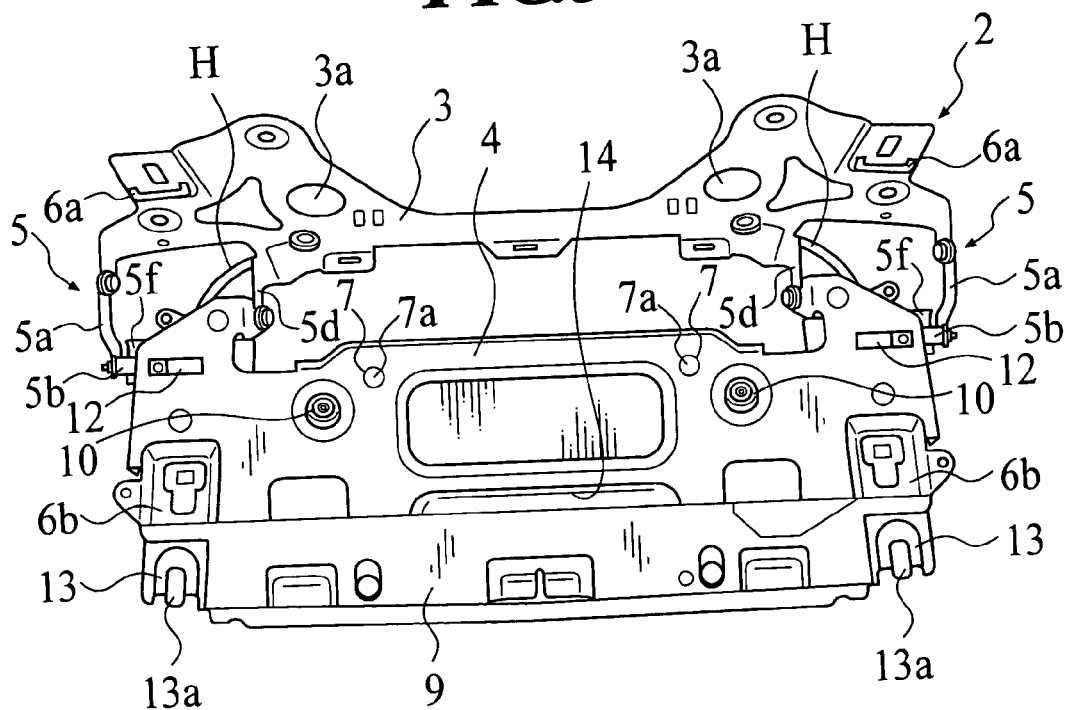
FIG. 3 is a front view of the license plate holding bracket in which the plate holding member erects on the gate side fixing member.
Figure 4:
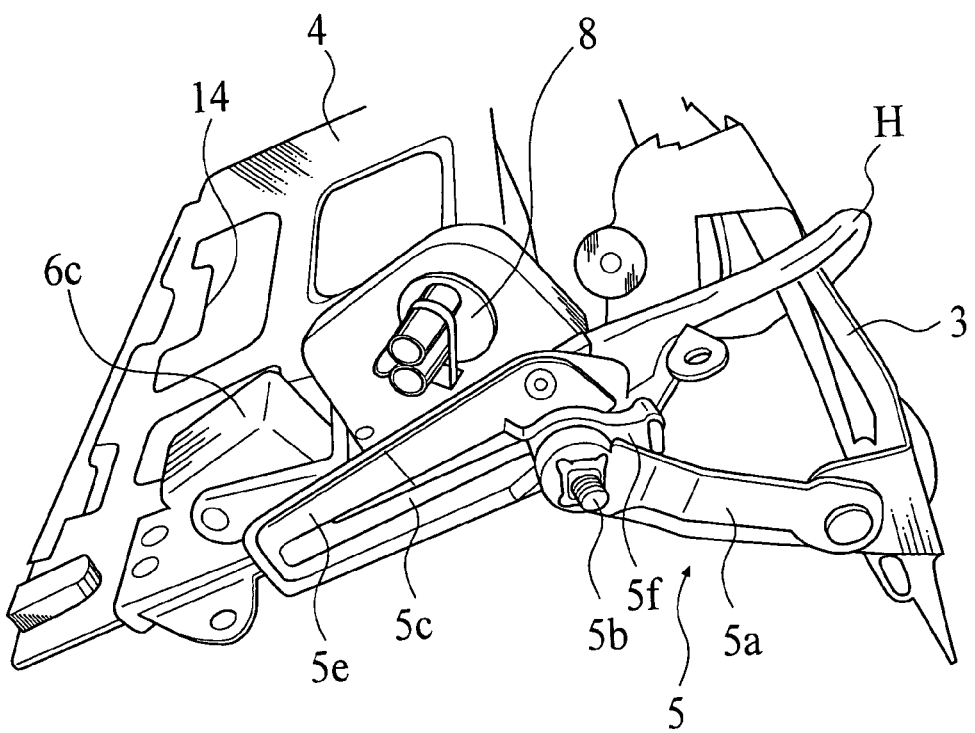
FIG. 4 is a perspective view of the license plate holding bracket in which the plate holding member erects on the gate side fixing member.
Figure 5:
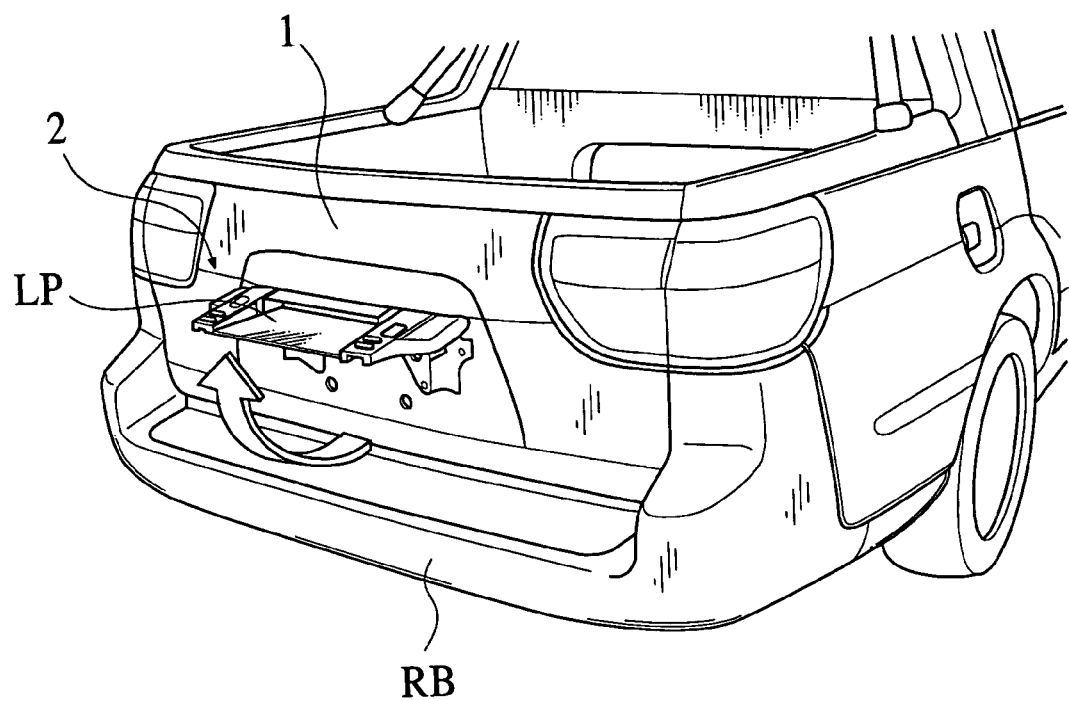
FIG. 5 is the perspective view showing a general appearance of the vehicle when the license plate erects on the tailgate set in the vertical state.
Figure 6:
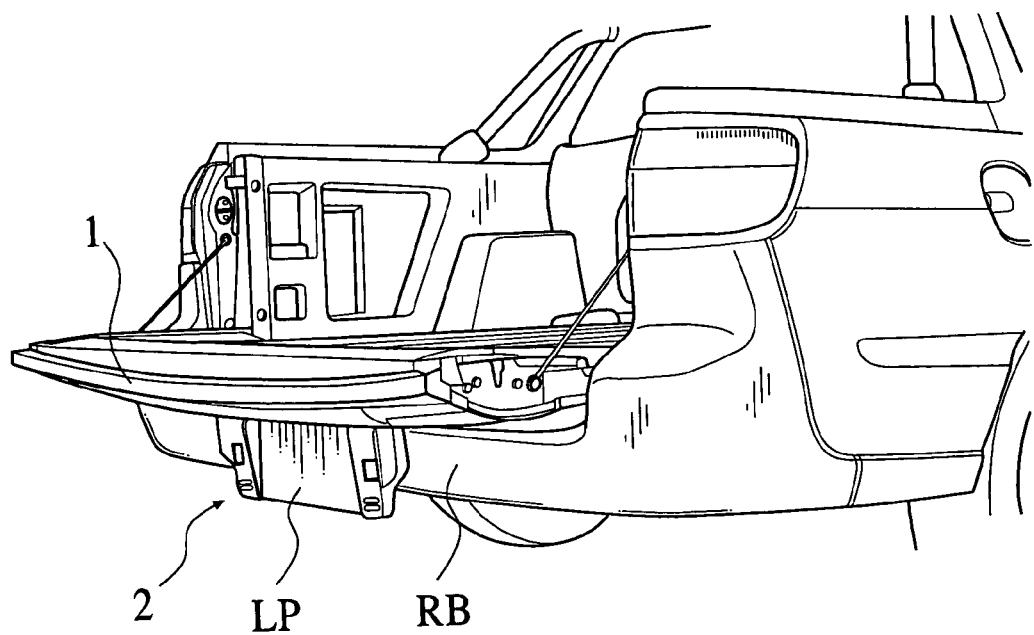
FIG. 6 is a perspective view showing a general appearance of the vehicle when the license plate erects on the tailgate set in the horizontal state.
Figure 7:
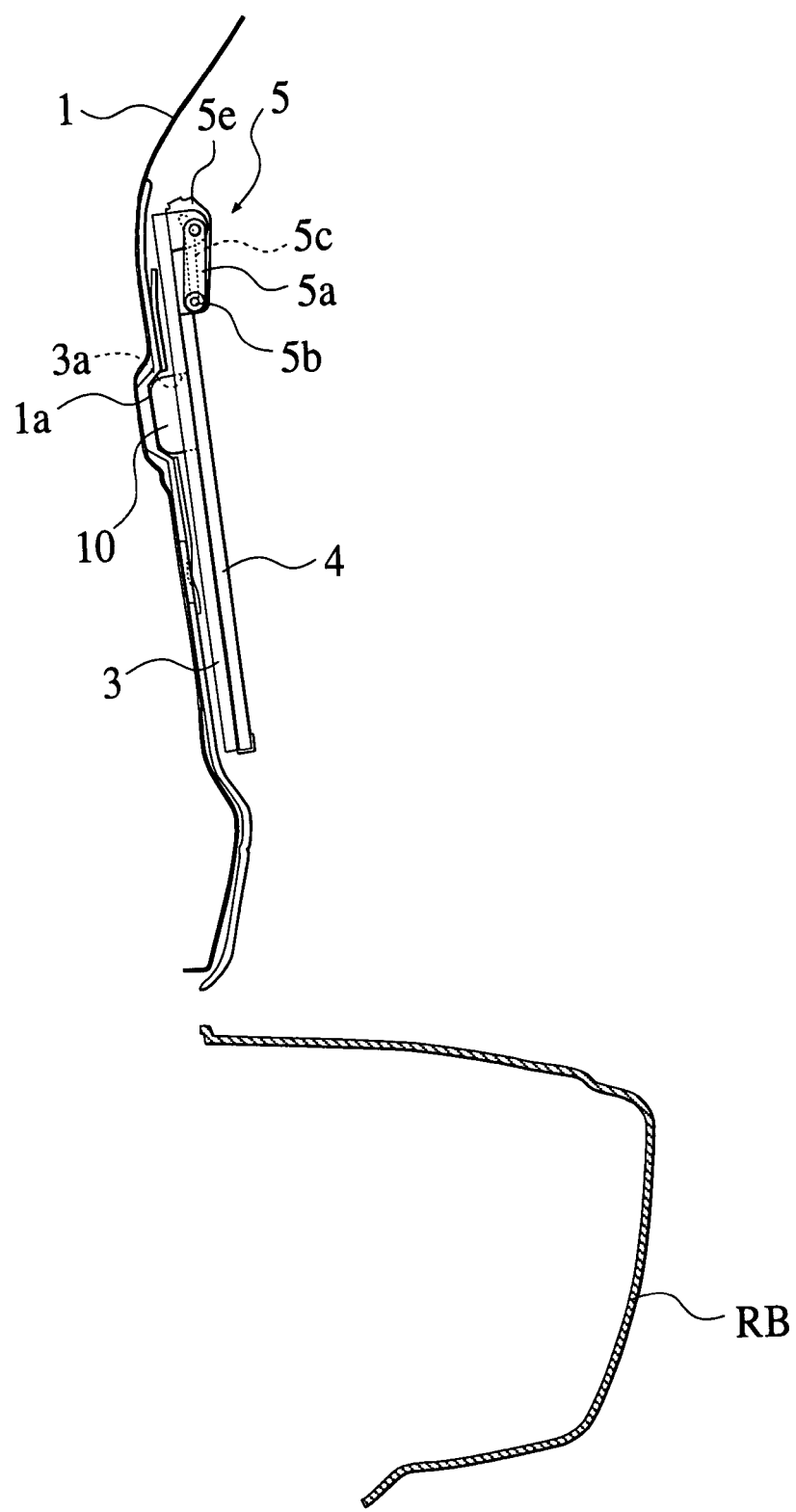
FIG. 7 is a partial side view of the vehicle when the license plate is in parallel with the tailgate which is set in the almost vertical state.
Figure 8:
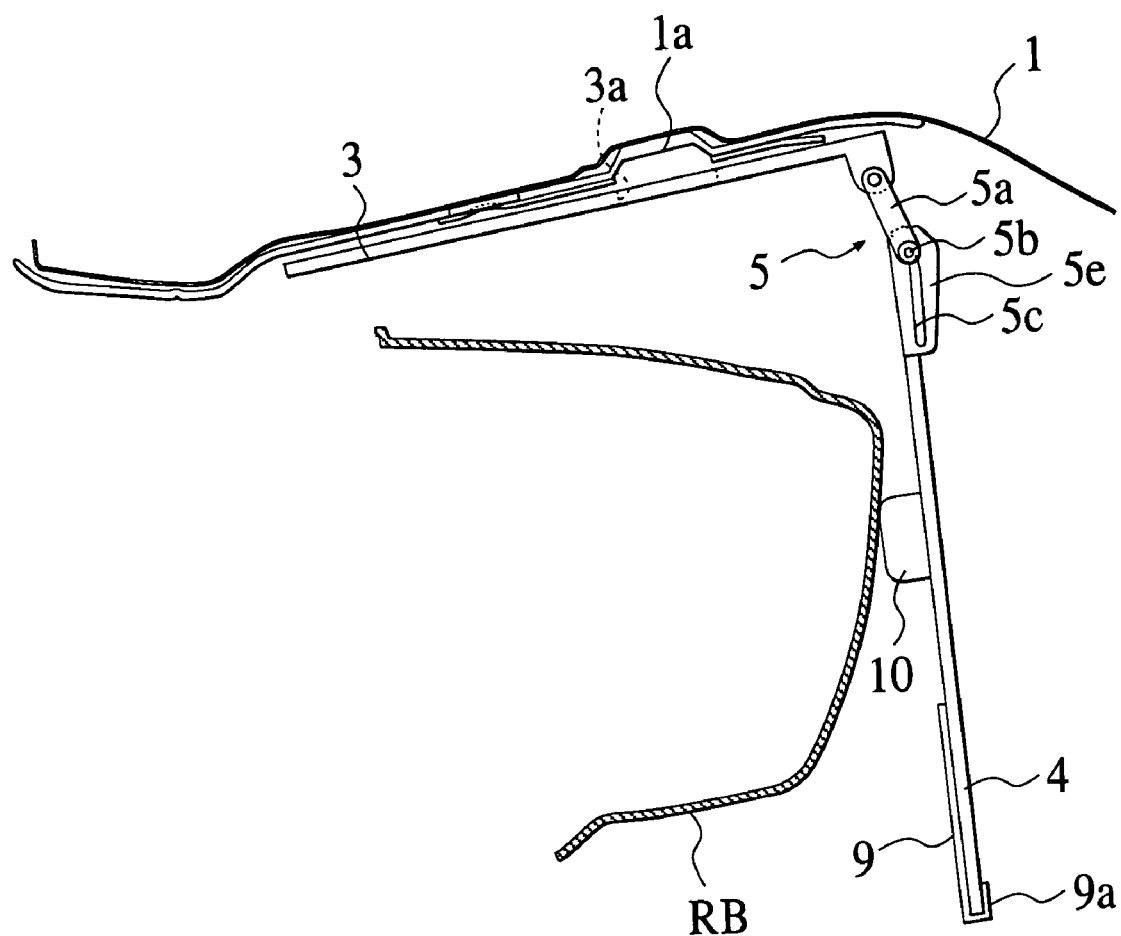
FIG. 8 is the partial side view of the vehicle when the license plate erects on the tailgate set in the horizontal state.
Figure 9:
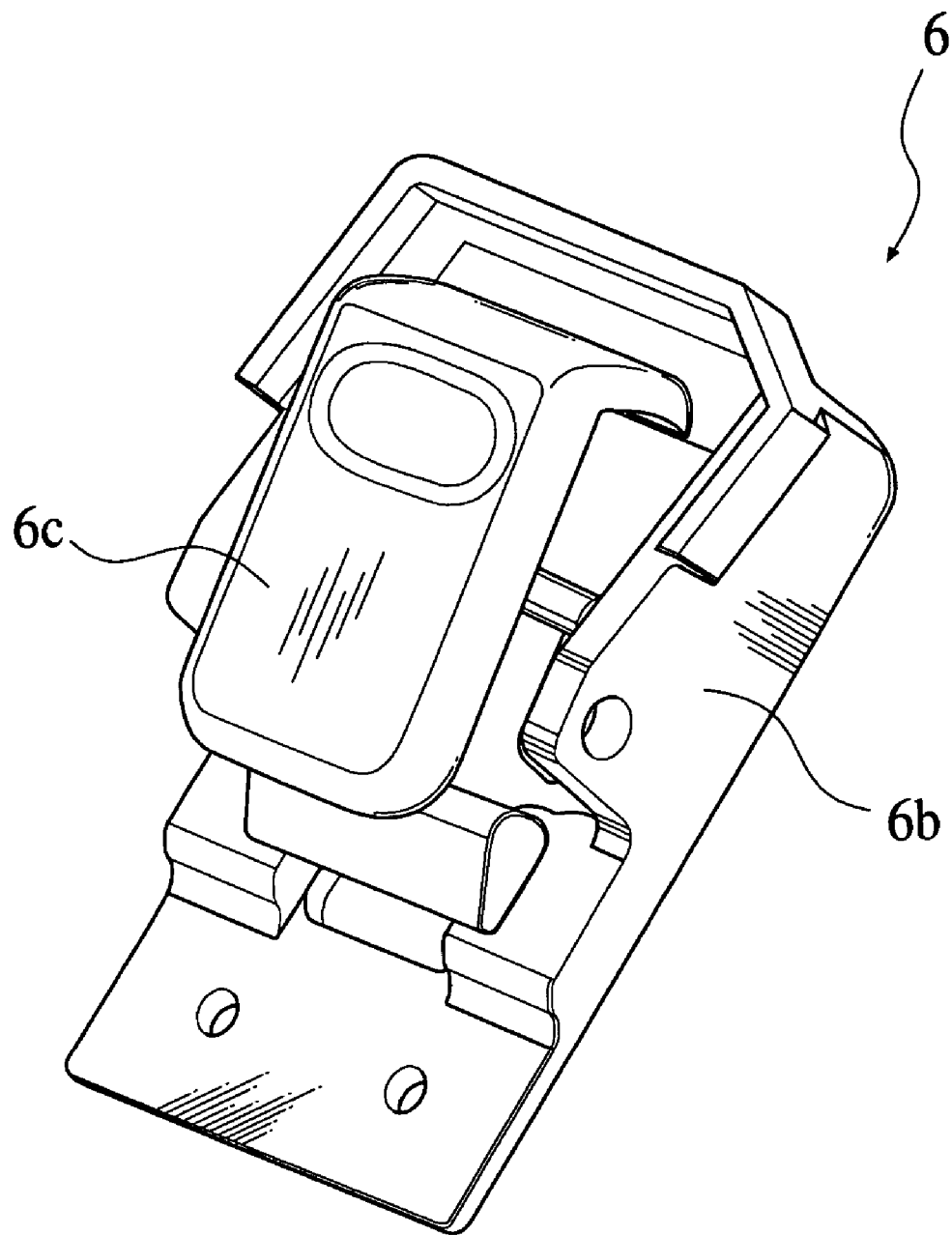
FIG. 9 is the perspective view showing the outside appearance of a lock mechanism.
Figure 10:
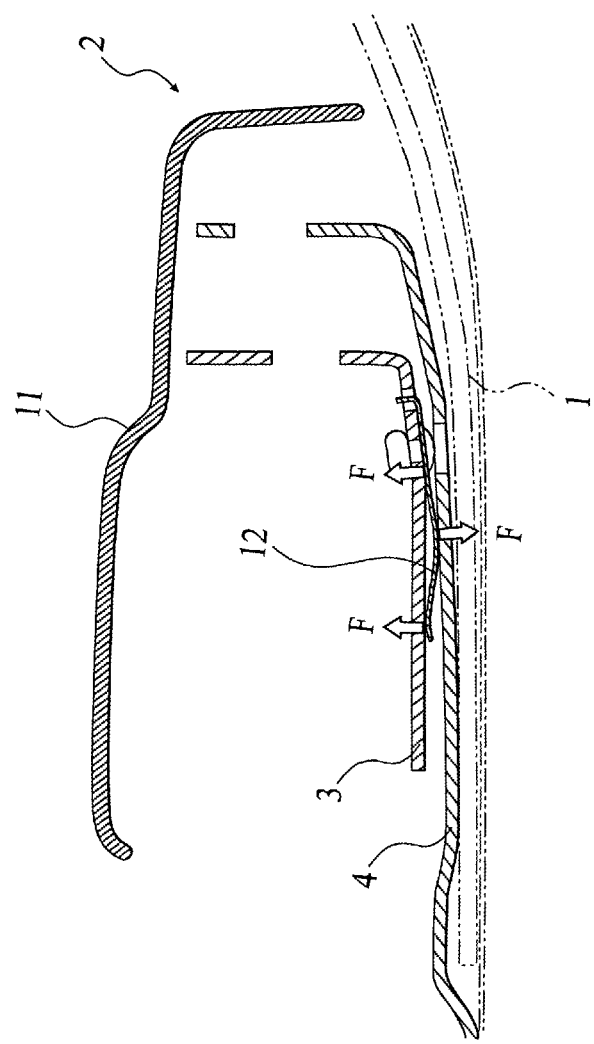
FIG. 10 is an explanatory sectional view of the license plate holding bracket in which the plate holding member is in parallel with the gate side fixing member.
Figure 11:
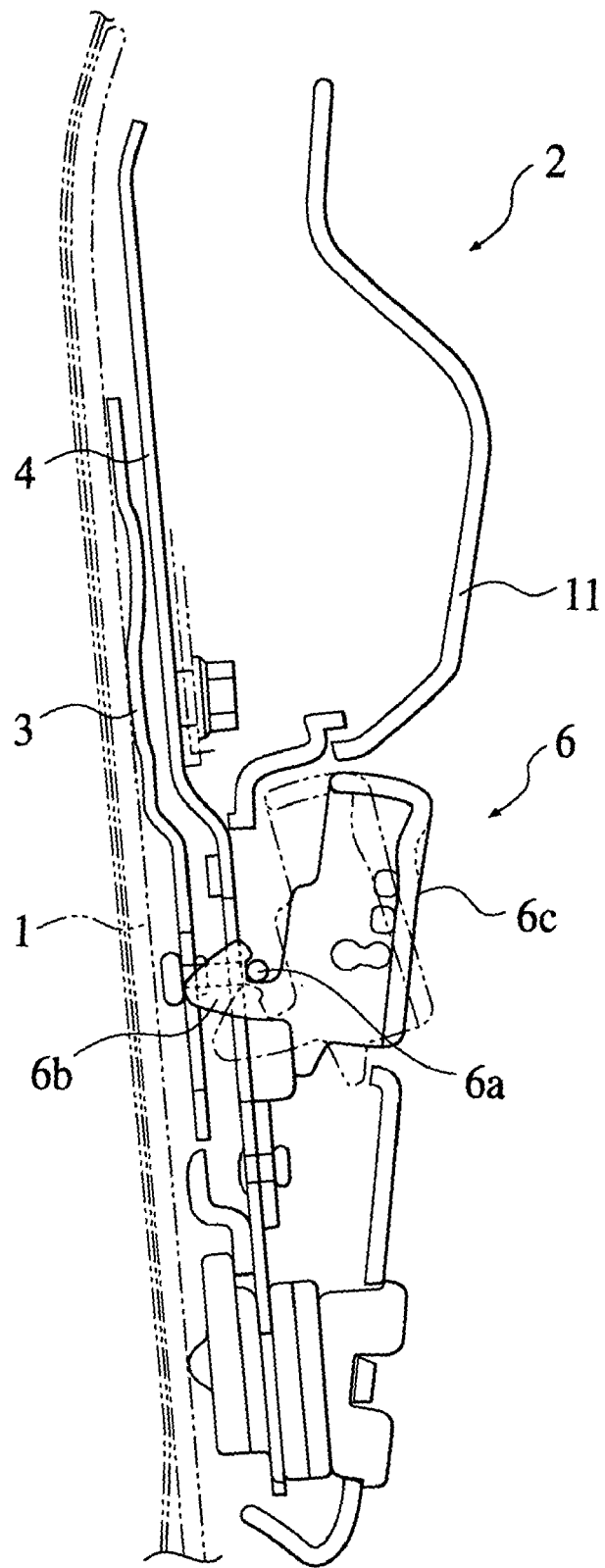
FIG. 11 is the explanatory sectional view of the license plate holding bracket showing an operation of the lock mechanism.

Hereinafter, an embodiment of the present invention will be explained with reference to the drawings. FIGS. 1 to 11 show the embodiment of the present invention. FIG. 1 is a back view of a vehicle of which a tailgate is in an almost vertical state; FIG. 2 is the back view of the license plate holding bracket in which the plate holding member is almost in parallel with the gate side fixing member in the embodiment; FIG. 3 is a front view of the license plate holding bracket in which the plate holding member erects on the gate side fixing member; FIG. 4 is a perspective view of the license plate holding bracket in which the plate holding member erects on the gate side fixing member; FIG. 5 is the perspective view showing an outside view of the vehicle when the license plate erects on the tailgate set in the vertical state; FIG. 6 is a perspective view showing the outside view of the vehicle when the license plate erects on the tailgate set in the almost horizontal state; FIG. 7 is a partial side view of the vehicle when the license plate is in parallel with the tailgate set in the vertical state; FIG. 8 is the partial side view of the vehicle when the license plate erects on the tailgate set in the almost horizontal state; FIG. 9 is the perspective view showing an outside view of the lock mechanism; FIG. 10 is the explanatory sectional view of the license plate holding bracket in which the plate holding member is in parallel with the gate side fixing member; and FIG. 11 is the explanatory sectional view of the license plate holding bracket showing the operation of the lock mechanism.

As shown in FIG. 1, a tailgate 1 is arranged at a rear end of a cargo bed of a vehicle to open or close thereof. The lower end of tailgate 1 is connected to the rear end of the bed on a condition that the tailgate 1 freely performs the reciprocal rotational movement relative to the cargo bed. The tailgate 1 set in the almost vertical state brings the bed to a closed state, and the tailgate 1 set to a horizontal state brings the bed to an open state.

A license plate holding bracket 2 is fixed to the tailgate 1 and holds a license plate LP to allow the license plate LP to freely perform a reciprocal rotational movement. As shown in FIG. 3, the license plate holding bracket 2 comprises a gate side fixing member 3 which is fixed to the tailgate 1, and a plate holding member 4 which has the license plate LP and is connected to the gate side fixing member 3 to freely perform the reciprocal rotational movement. As shown in FIG. 4, the gate side fixing member 3 and the plate holding member 4 are connected to each other through a rotational movement mechanism 5 and can be locked up by a lock mechanism 6 shown in FIGS. 2 and 3. In detail, the tailgate 1 freely performs the rotational movement relative to the bed, and the plate holding member 4 freely performs the rotational movement relative to the gate side fixing member 3 (that is, to the tailgate 1). Therefore, as shown in FIGS. 5 and 6, the plate holding member 4 can be reciprocally and rotationally moved according to the position of the rotational movement of the tailgate 1. Hereinafter, under the condition that the license plate LP is set to be in parallel with the tailgate 1 which is set in the vertical state, the license plate holding bracket 2 will be explained on the basis of the front, rear, upper and lower directions.

As shown in FIGS. 7, 8 and 11, the gate side fixing member 3 is formed in a plate shape and is fixed to the tailgate 1 along the surface of the tailgate 1. The gate side fixing member 3 extends in the right and left directions, and the rotational movement mechanism 5 is connected to each of the right and left ends of the gate side fixing member 3. In this embodiment, the rotational movement mechanism 5 is connected to the upper end side of the gate side fixing member 3. As shown in FIG. 3, a striker 6a of the lock mechanism 6 is attached to each of the right and left ends of the gate side fixing member 3.

The striker 6a is formed in an almost C-shaped and protrudes from the gate side fixing member 3 toward the plate holding member 4. In this embodiment, right, left and central lower portions of the gate side fixing member 3 are cut out.

As shown in FIG. 2, the plate holding member 4 is formed in an almost rectangular plate shape and holds the license plate LP. In this embodiment, the rotational movement mechanism 5 is connected to upper right and left ends of the plate holding member 4. In this embodiment, welded bolts 7 are arranged in the plate holding member 4 to hold the license plate LP. A lamp 8 shown in FIG. 4 is arranged on the resin cover 11 placed at the right end of the rear surface of the plate holding member 4 to illuminate the license plate LP. A resin member 9 is attached to the plate holding member 4 to cover the lower end and the front lower portion of the plate holding member 4. A pair of stoppers 10 are also arranged on the right and left sides of the front surface of the plate holding member 4. Further, latches 6b of the lock mechanism 6, as shown in FIG. 3 are arranged on the front surface of the plate holding member 4. On the rear surface of the plate holding member 4, operation buttons 6c connected to the latches 6b are arranged. Peripheries of the operation buttons 6c are covered with the resin cover 11.

As shown in FIG. 3, each stopper 10 is arranged on the front surface of the plate holding member 4 to protrude from the front surface. In this embodiment, each stopper 10 is formed out of rubber material which is formed in an almost cylindrical shape narrowed toward the front direction. Stopper inserting holes 3a are formed in the gate side fixing member 3, and the stopper 10 are inserted into the stopper inserting holes 3a respectively when the plate holding member 4 is rotationally moved toward the tailgate 1.

In addition, as shown in FIGS. 7 and 8, receiving cavities 1a are formed in the tailgate 1 for receiving the stoppers 10 when the plate holding member 4 is rotated toward the tailgate 1. Each receiving cavity 1a is formed in concave against the bracket 2 to allow the stoppers 10 to contact the portion of the corresponding receiving cavity 1a.

Each lock mechanism 6 has a striker 6a, a latch 6b and an operating button 6c. A perspective view of the outside view of the lock mechanism 6 is shown in FIG. 9. Here, because the striker 6a and the latch 6b are almost the same as those in the earlier development, the striker 6a and the latch 6b are not described in detail. FIG. 11 shows a state of the latch 6b hooked on the striker 6a. As shown by a dotted line of FIG. 11, when an operator moves the latch 6b by operating the button 6c, engagement of the latch 6b and the striker 6a can be released.

As shown in FIG. 3, plain springs 12 which function as biasing means are arranged on the front surface of the plate holding member 4. In a state of the gate side fixing member 3 being approximately in parallel with the plate holding member 4, as shown in FIG. 10, each plain spring 12 which functions as an elastic member, is sandwiched and compressed by the gate side fixing member 3 and the plate holding member 4, with giving a reaction force F to the members 3 and 4.

Figure 12:
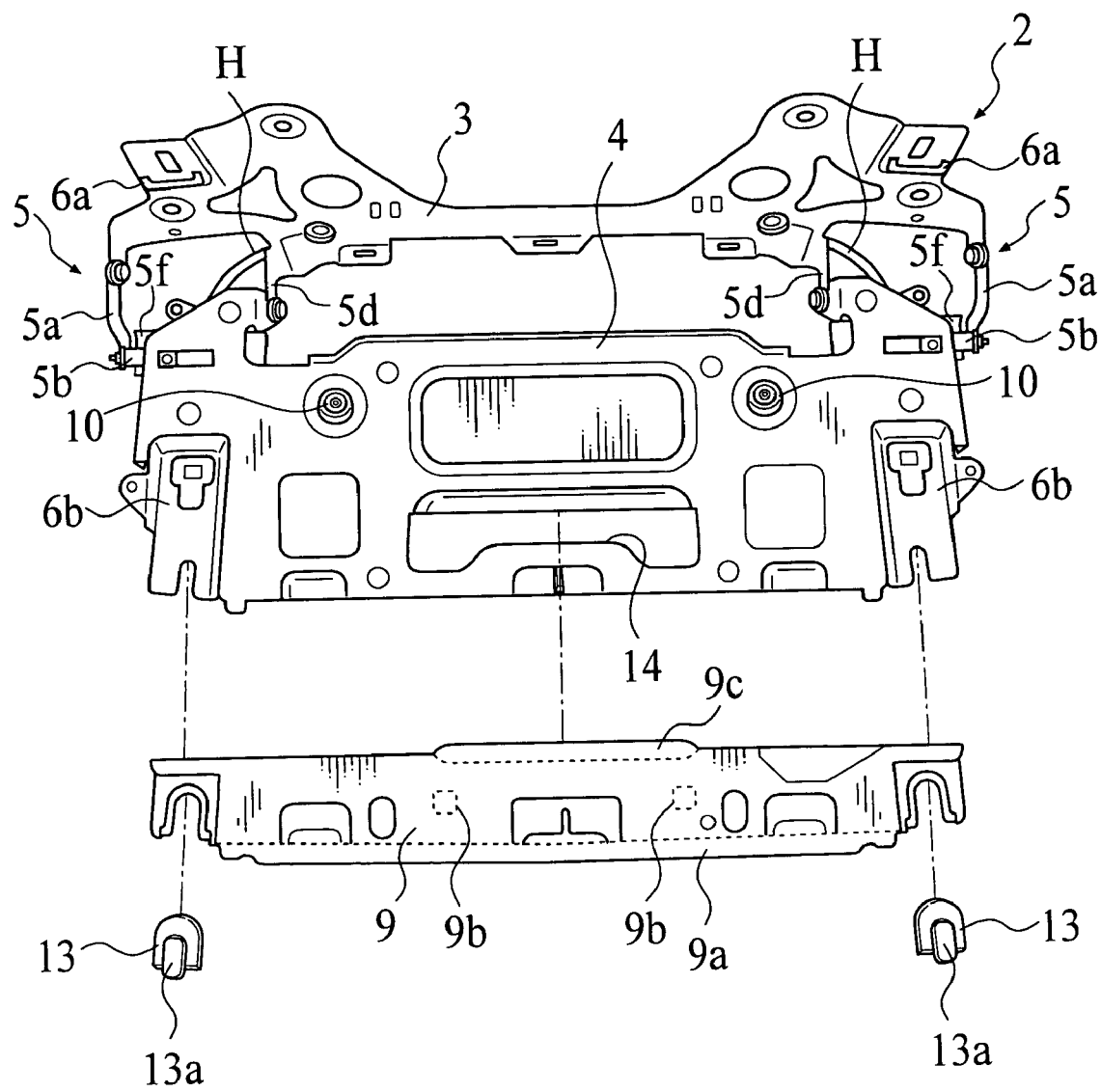
FIG. 12 is a back view of the license plate holding bracket in which the plate holding member is in parallel with the gate side fixing member.

As shown in FIG. 12, the resin member 9 is formed in an almost rectangular plain shape and is for covering the lower end and the front lower portion of the plate holding member 4. The resin member 9 freely engages with and is detached from the lower portion of the plate holding member 4. In this embodiment, a rotational portion 9a is formed at the lower end of the resin member 9, and the lower end of the plate holding member 4 can be tightly inserted into the portion 9a.

On the rear surface of the resin member 9, as shown in FIGS. 2 and 12, a pair of hooks 9b are arranged. Each hook 9b is engageable with the lower periphery of a hole 14 which is formed in the plate holding member 4. The resin member 9 is fixed to the plate holding member 4 by engaging each hook 9b with the lower periphery of the hole 14 of the plate holding member 4.

As shown in FIG. 12, a holding portion 9c to be brought into contact with a portion near the hole 14, on the rear surface of the plate holding member 4 is formed on the upper end of the resin member 9. In this embodiment, the holding portion 9c is formed in a plain shape.

On the lower end of the plate holding member 4, as shown in FIG. 12, fixing members 13 are provided to fix the lower end side of the resin member 9 to freely engage with and detach from the lower portion of the plate holding member 4. In this embodiment, a pair of fixing members 13 are arranged on the right and left sides of the plate holding member 4. A rubber member 13a protruding forward is arranged on the front surface of each fixing member 13.

When the license plate LP is set to be almost in parallel with the tailgate 1, the stoppers 10 and the fixing members 13 are brought into contact with the tailgate 1.

Figure 13:
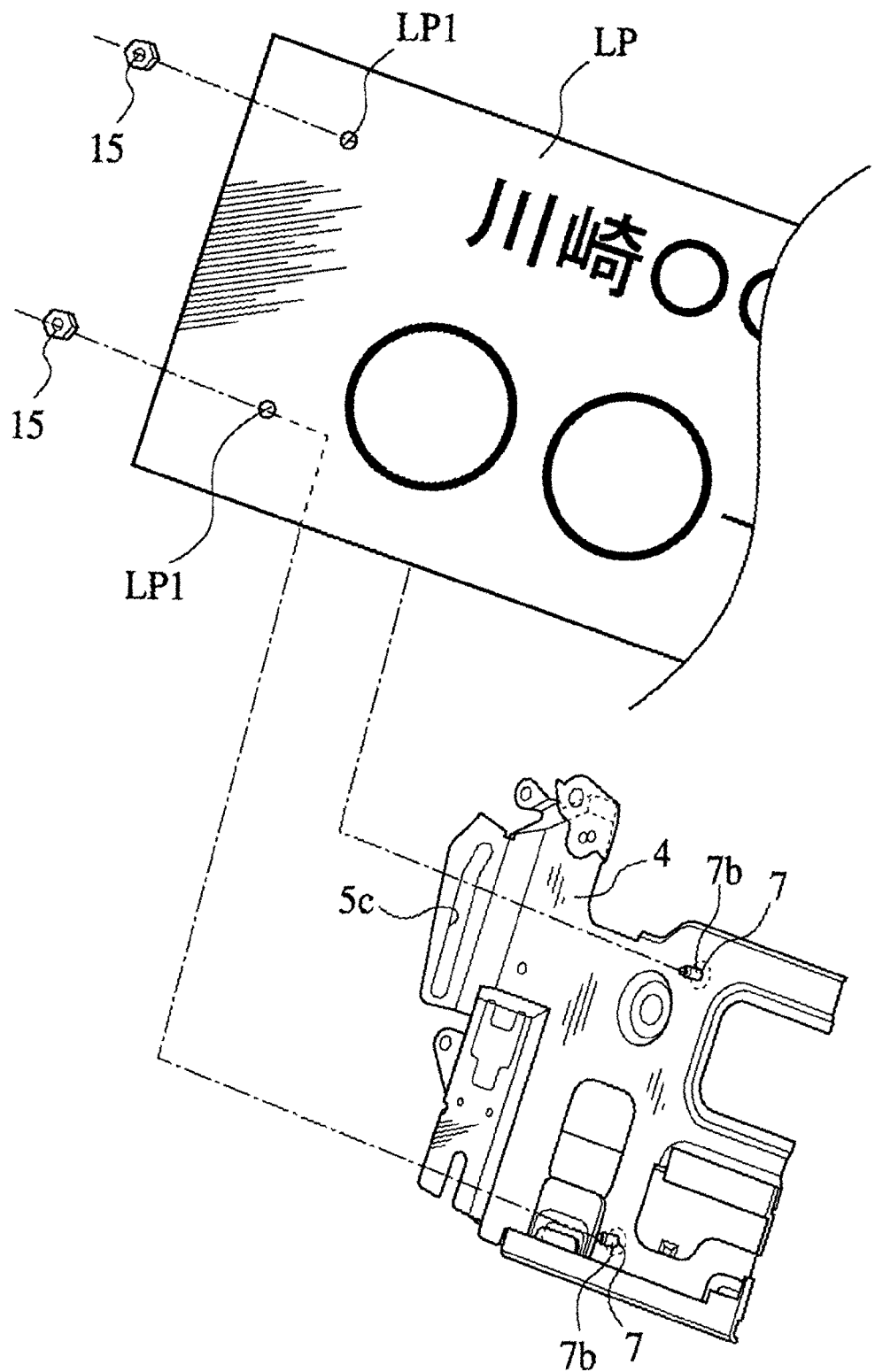
FIG. 13 is the explanatory view showing the license plate attached to the plate holding member.
Figure 14:
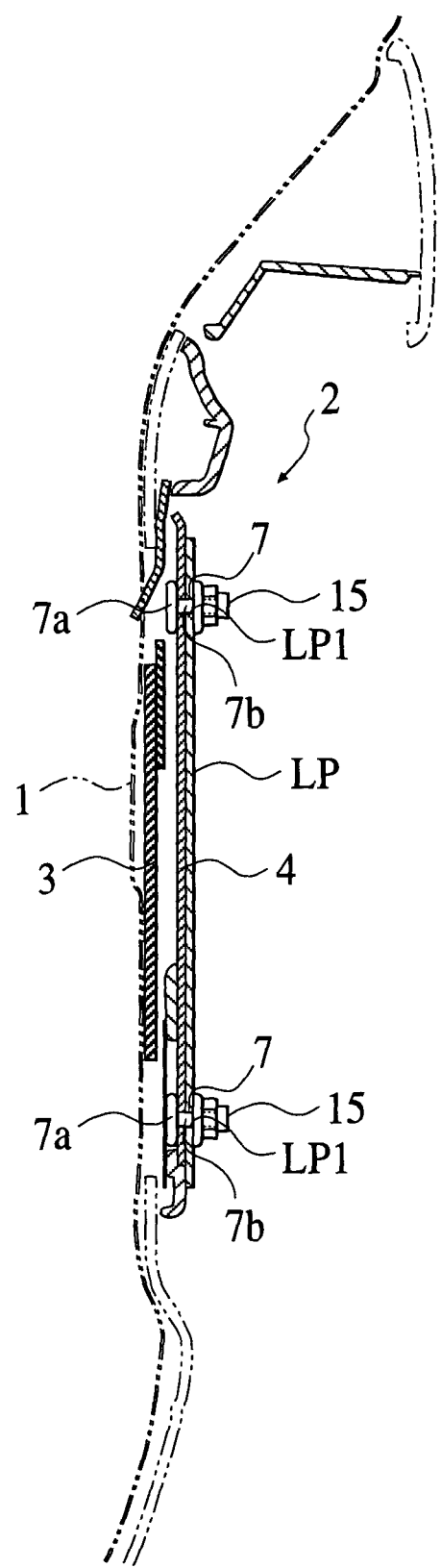
FIG. 14 is the explanatory partial side view of the vehicle when the license plate is in parallel with the tailgate set in the vertical state.
Figure 15:
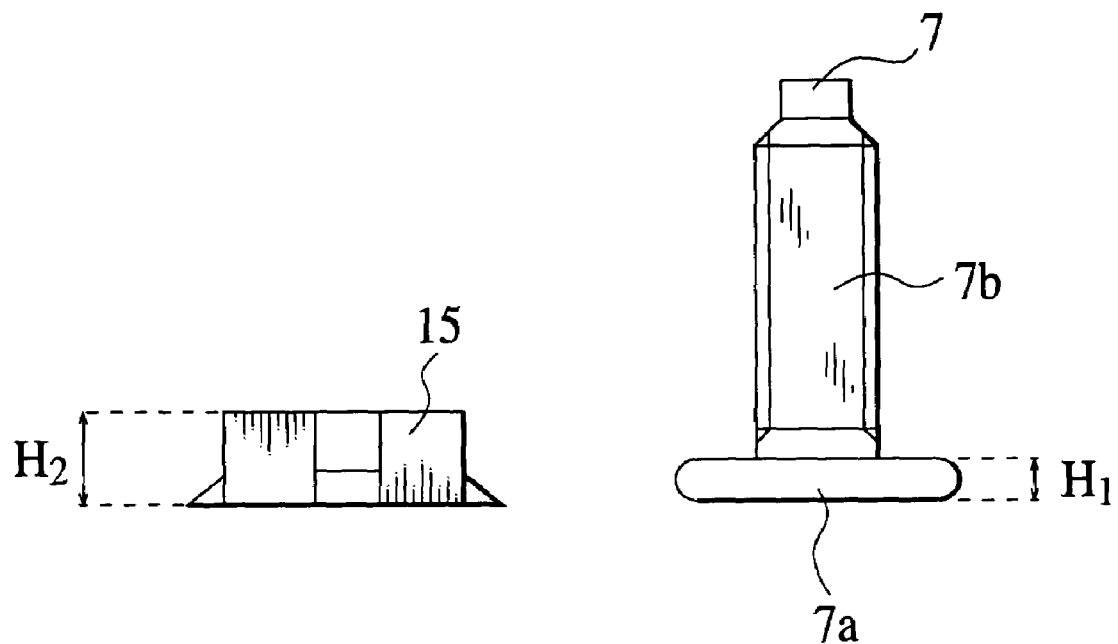
FIG. 15 is a view showing the comparison of the length of a head of a welded bolt and a length of a welded nut in an axial direction.

As shown in FIGS. 2, 3 and 15, a head 7a of the welded bolt 7 protrudes from the front surface of the plate holding member 4. A male screw 7b of the welded bolt 7 protruding from the rear surface of the plate holding member 4 is welded to the plate holding member 4. Each welded bolt 7 is inserted into a holding hole LP1 formed in the license plate LP, and a welding nut 15 is screwed on the welded bolt 7, as shown in FIG. 13.

The rotational movement mechanism 5 will be explained as follows. As shown in FIG. 4, the rotational movement mechanism 5 has stays 5a and grooves 5c. One end of each stay 5a is attached to the upper right and upper left ends of the gate side fixing member 3. Each groove 5c is formed at the upper right and upper left ends of the plate holding member 4, and a pin 5b placed on the other end of each stay 5a is inserted into the groove 5c. When the pin 5b is moved in the groove 5c, the stay 5a is rotationally moved, and the plate holding member 4 is reciprocally and rotationally moved. In this embodiment, as shown in FIG. 3, the rotational movement mechanism 5 has a pair of axial support portions 5d protruding from the gate side fixing member 3 to the plate holding member 4. Each axial support portion 5d connects the upper end of the gate side fixing member 3 and the upper end of the plate holding member 4 so as to allow the plate holding member 4 to freely perform a reciprocal and rotational movement centered on the axial support portions. That, is, centered on the axial support portions 5d, which is a position away from the gate side fixing member 3 toward the plate holding member 4, the plate holding member 4 can be reciprocally rotated with respect to the gate side fixing member 3.

As shown in FIG. 4, in this embodiment, the grooves 5c are formed in plate members 5e which protrude backward from the right and left ends of the plate holding member 4. Each groove 5c extends along the plate holding member 4 to be away from a connected point of the members 3 and 4.

The rotational movement mechanism 5 has pin engaging members 5f arranged in the plate members 5e, as shown in FIG. 4. Each pin engaging member 5f engages with the pin 5b when the plate holding member 4 erects on the gate side fixing member 3. In this embodiment, the pin engaging member 5f is formed in a ring shape with an inlet opening and the inner diameter of the ring is almost the same as the outer diameter of the pin 5b. The pin engaging member 5f is arranged at the other side of the groove 5c and the inlet opening of the pin engaging member 5f faces toward the groove 5c. Because the pin engaging member 5f can be deformed elastically, the pin 5b can pass through the inlet opening against the elastic force of the pin engaging member 5f. In such a state of the pin 5b being received in the pin engaging member 5f, the stay 5a is fixed. Accordingly, the plate holding member 4 is supported by the stays 5a while the plate holding member 4 erects on the gate side fixing member 3.

Figure 16:
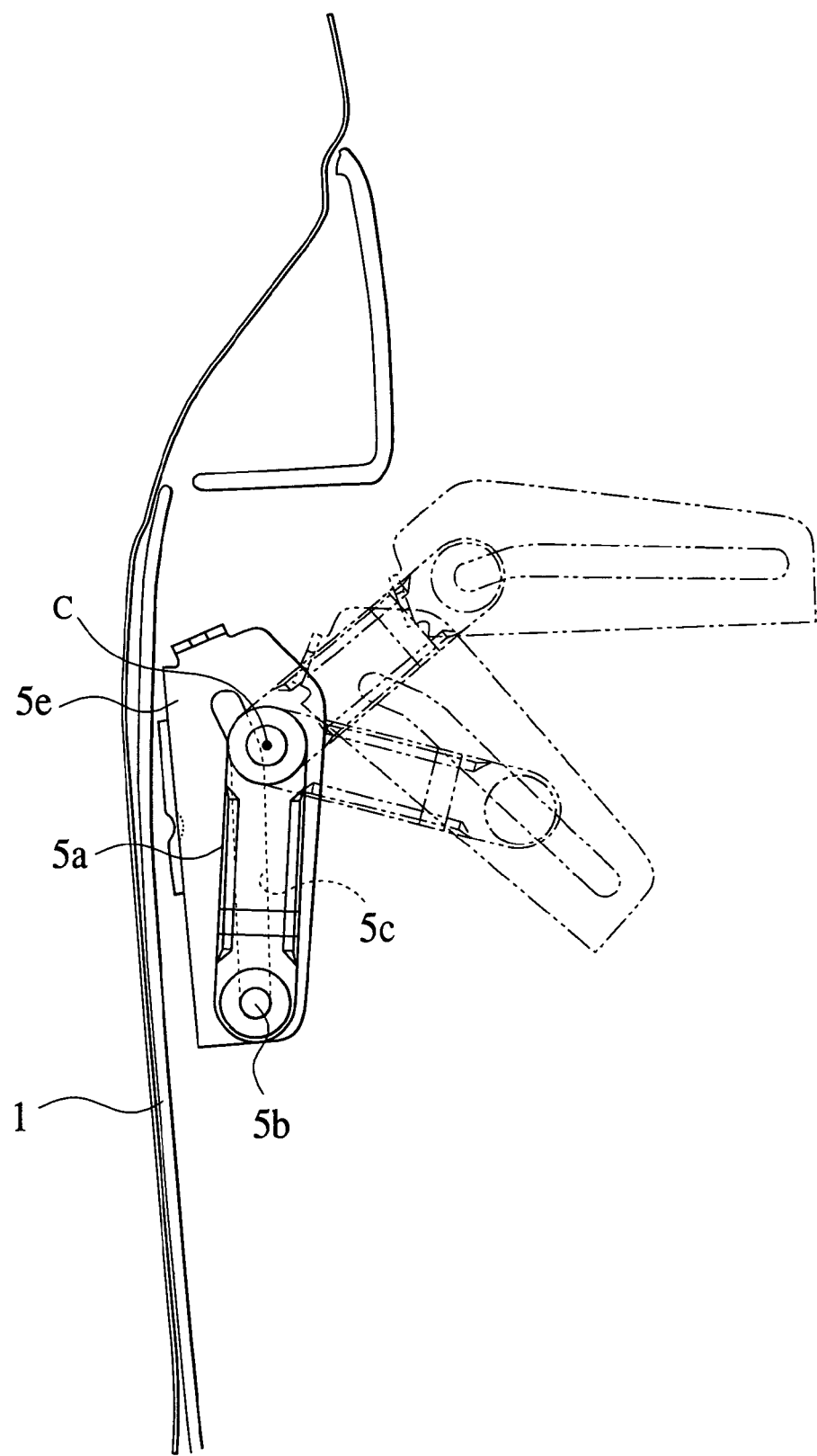
FIG. 16 is the explanatory view showing an operation of the rotational movement mechanism.

In this embodiment, as shown in FIG. 16, the rotational movement mechanism 5 has a structure that the pin 5b is placed at one end of the groove 5c when the plate holding member 4 is set to be almost in parallel with the gate side fixing member 3, and the pin 5b is placed at the other end of the groove 5c when the plate holding member 4 erects on the gate side fixing member 3. As shown in FIGS. 4 and 16, the rotational movement mechanism 5 has the structure that the stay 5a is rotated by an angle exceeding almost 90 degrees from the almost parallel state to the gate side fixing member 3 when the plate holding member 4 being almost in parallel with the gate side fixing member 3 is changed to an almost erecting state on the gate side fixing member 3.

A part of the groove 5c in the other end side thereof is bent (or inclined) toward the center of the rotational movement of the stay 5a. In this embodiment, when seeing the one end side of the groove 5c from the other end side thereof, the other end side of the groove 5c is bent toward a direction opposite to the direction of the rotational movement of the plate holding member 4 which is rotationally moved to change the plate holding member 4 almost erecting on the gate side fixing member 3 to the plate holding member 4 which is almost in parallel with the gate side fixing member 3. In this embodiment, the groove 5c is formed in an almost L-shaped. In the figures, the reference character "H" denotes a wire harness.

In the above structure, the plate holding member 4 is connected to the gate side fixing member 3 through the rotational movement mechanism 5 to freely perform the rotational movement relative to the gate side fixing member 3. Therefore, the license plate LP can be moved between the parallel state of the license plate LP to the tailgate 1 and the erecting state of the license plate LP on the tailgate 1. In this embodiment, one end of the plate holding member 4 in one side in one of predetermined directions is connected to the gate side fixing member 3. When the license plate LP is almost in parallel with the tailgate 1 (in the almost vertical state), the predetermined directions and the one end denote the upper and lower directions and the upper end, respectively.

In the license plate holding bracket 2 having the above described structure, as shown in FIGS. 1 and 7, when the tailgate 1 is in the almost vertical state, the plate holding member 4 is positioned to set the license plate LP in parallel with the tailgate 1. Therefore, the license plate LP can be seen and recognized from the rear of the vehicle.

In this case, the gate side fixing member 3 and the plate holding member 4 are locked by the lock mechanism 6, as shown in FIG. 11. Because the plate holding member 4 is almost in parallel with and close to the gate side fixing member 3, the whole bracket 2 is set to be folded up. Because the plate holding member 4 having the grooves 5c is placed close to the gate side fixing member 3, the pin 5b of the stay 5a is positioned close to the gate side fixing member 3. As a result, both the one end and the other end of the stay 5a approach the gate side fixing member 3, and the stay 5a is also almost in parallel with the gate side fixing member 3, as shown in FIG. 7.

When the tailgate 1 is in the almost horizontal state, as shown in FIGS. 6 and 8, the plate holding member 4 is positioned to set the license plate LP erecting on the tailgate 1. In this embodiment, as shown in FIG. 5, the plate holding member 4 is rotationally moved relatively to the gate side fixing member 3 to move the lower end side of the plate holding member 4 away from the gate side fixing member 3, and the plate holding member 4 protrudes from the tailgate 1. In this case, the license plate LP almost erects on the tailgate 1. Therefore, because the license plate LP protrudes downwardly from the tailgate 1 set in the almost horizontal state, the license plate LP can be seen and recognized from the rear of the vehicle.

In this case, because the plate holding member 4 with the grooves 5c erects on the gate side fixing member 3, the pin 5b of the stay 5a is placed away from the gate side fixing member 3. As a result, the other end of the stay 5a is away from the gate side fixing member 3, and the stay 5a supports the plate holding member 4 while the stay 5a makes a predetermined angle with the gate side fixing member 3. Because the pin 5b engages with the pin engaging member 5f, the stay 5a is fixed, and the gate side fixing member 3 and the plate holding member 4 are locked together.

As shown in FIG. 16, the stay 5a is reciprocally rotated by an angle exceeding almost 90 degrees when the license plate LP almost erects on the tailgate 1. Therefore, the amount of the rotational movement of the stay 5a relative to the gate side fixing member 3 is larger than that of the plate holding member 4, and the stay 5a supports the plate holding member 4 at a comparatively low angle defined in the direction of the rotational movement of the plate holding member 4. Accordingly, the load applied from the plate holding member 4 to the stay 5a in the direction of the rotational movement of the plate holding member 4 can be received by the stay 5a in the direction to press the stay 5a.

When the license plate LP is reciprocally rotated to change the license plate LP almost erecting on the tailgate 1 to the license plate LP almost in parallel with the tailgate 1, until the stay 5a becomes almost perpendicular to the gate side fixing member 3, the pin 5b is moved away from the gate side fixing member 3. Because the other end of the groove 5c is formed to be bent toward the center of the rotational movement of the stay 5a, the load applied from the pin 5b to the groove 5c in a direction opposite to the direction of the rotational movement can be released.

In other words, force in a direction pressing the stay 5a, that is, the force in a longitudinal direction of the stay 5a is applied to the groove 5c of the plate holding member 4, and then the stay 5a becomes in a stretching state against the rotational movement of the plate holding member 4. The force in a direction opposite to the moving direction of the plate holding member 4 rotationally moved is applied from the pin 5b to the groove 5c. Because the other end of the groove 5c is bent toward the direction opposite to the direction of the rotational movement of the plate holding member 4 which is rotated to change from the state almost erecting on the gate side fixing member 3 to the state almost being in parallel with the gate side fixing member 3, a load exerted between the pin 5b and the groove 5c can be released. When the plate holding member 4 is rotated to change from the state almost being in parallel with the gate side fixing member 3 to the state almost erecting on the gate side fixing member 3, the load exerted between the pin 5b and the groove 5c can also be released in the same manner.

In the license plate holding bracket 2 having the above described structure, as shown in FIGS. 1 and 7, when the tailgate 1 is in the almost vertical state, the plate holding member 4 is positioned to set the license plate LP parallel with the tailgate 1. In this embodiment, the plate holding member 4 is rotationally moved relatively to the gate side fixing member 3 on a condition that the other end of the plate holding member 4 in a side in the other predetermined direction of the plate holding member 4 is close to the gate side fixing member 3, and the whole bracket 2 is folded up to obtain the plate holding member 4 parallel with the gate side fixing member 3. Therefore, the license plate LP becomes in parallel with the tailgate 1. Accordingly, the license plate LP can be seen and recognized from the rear of the vehicle. In this case, each stopper 10 contacts the tailgate 1.

In this embodiment, as shown in FIG. 7, when each stopper 10 contacts the tailgate 1, each stopper 10 is received in the cavity 1a of the tailgate 1. Therefore, the plate holding member 4 can be placed at a position close to the tailgate 1 without relation to the size of each stopper 10.

As shown in FIG. 11, the gate side fixing member 3 and the plate holding member 4 are locked together by the lock mechanism 6, and the plate holding member 4 and the license plate LP are reliably fixed to the tailgate 1. Because the gate side fixing member 3 and the plate holding member 4 receive the biasing force from the plain spring 12 to separate the gate side fixing member 3 and the plate holding member 4 from each other, the plate holding member 4 and the license plate LP are fixed without being shaken, as shown in FIG. 10.

As shown in FIGS. 6 and 8, when the tailgate 1 is in the almost horizontal state, the plate holding member 4 are positioned to set the license plate LP almost erecting on the tailgate 1. In this embodiment, as shown in FIG. 5, the plate holding member 4 is rotated relatively to the gate side fixing member 3 to make the other end of the plate holding member 4 on the side in the other predetermined direction be away from the gate side fixing member 3. When the plate holding member 4 protrudes from the tailgate 1, the license plate LP almost erects on the tailgate 1. Because the license plate LP protrudes downwardly from the tailgate 1 set in the almost horizontal state, the license plate LP can be seen and recognized from the rear of the vehicle. In this case, each stopper 10 contacts the rear bumper RB.

Because each stopper 10 is made of the elastic material, the relative movement of the plate holding member 4 to the tailgate 1 or the rear bumper RB caused by the vibration of the vehicle at the running time is prevented by the expansion and contraction of each stopper 10. That is, the plate holding member 4 can securely follow the movement of the tailgate 1 or the rear bumper RB on the running of the vehicle.

Because each stopper 10 is made from the rubber material, even though the load is applied from each stopper 10 to the tailgate 1 or the rear bumper RB when the plate holding member 4 is rotationally moved relatively to the tailgate 1 or the vehicle is run, a portion of the tailgate 1 or the rear bumper RB contacted with each stopper 10 is not worn away by the stopper 10.

Next, operating steps in the change of the tailgate 1 from the almost vertical state to the almost horizontal state will be described, as follows.

The operator releases the lock of the gate side fixing member 3 and the plate holding member 4, performed by the lock mechanism 6. In this case, because the plain spring 12 exerts the biasing force on the gate side fixing member 3 and the plate holding member 4 to separate the gate side fixing member 3 and the plate holding member 4 from each other, the lower end of the plate holding member 4 rises from the gate side fixing member 3, as shown in FIG. 10. Therefore, an open space is generated between the gate side fixing member 3 and the plate holding member 4, and the operator can hold the plate holding member 4 by inserting operator's fingers in the open space. The operator rotationally moves the plate holding member 4 relatively to the gate side fixing member 3 while holding the lower end of the plate holding member 4, and the operator sets the license plate LP to almost erect on the tailgate 1. Thereafter, the operator sets the tailgate 1 to be in the almost horizontal state. Therefore, the license plate LP protrudes downwardly from the tailgate 1.

When the tailgate 1 set in the almost horizontal state is changed to the almost vertical state, the operation changes the tailgate 1 to the almost vertical state. Thereafter, the operator rotationally moves the lower end of the plate holding member 4 to approach the gate side fixing member 3, and the operator locks the gate side fixing member 3 and the plate holding member 4 by using the lock mechanism 6. Thereby, the license plate LP becomes almost in parallel with the tailgate 1.

In this embodiment, as shown in FIG. 11, because the gate side fixing member 3 and the plate holding member 4 are locked due to the engagement of the latch 6b and the striker 6a, the members 3 and 4 can be securely fixed to each other. The load is exerted on fitting portions of the striker 6a when the latch 6b is hooked on the striker 6a. However, because the striker 6a is arranged on the gate side fixing member 3 fixed to the tailgate 1, the tailgate 1 can receive the load.

As described above, in the license plate holding bracket 2 according to this embodiment, the license plate LP can be seen and recognized from the rear of the vehicle regardless of whether the tailgate 1 is in the almost vertical or horizontal state. That is, even though the cargo bed of the vehicle is open, the license plate LP can be seen and recognized from the rear of the vehicle. The vehicle can be run without any trouble, and the license plate holding bracket 2 is advantageous for practical use.

When the license plate LP is approximately in parallel with the tailgate 1, because each stopper 10 of the plate holding member 4 contacts the tailgate 1, the plate holding member 4 and the license plate LP can be securely supported by the tailgate 1, and the vibration of the license plate LP can be suppressed. When the tailgate 1 is set in the almost horizontal state and the license plate LP almost erects on the tailgate 1, because each stopper 10 contacts the rear bumper RB, the plate holding member 4 and the license plate LP can be securely supported by the rear bumper RB, and the vibration of the license plate LP can be suppressed. Therefore, regardless of whether the tailgate 1 is in the almost vertical or horizontal state, the vibration of the license plate LP can be suppressed. The reliability and durability of the bracket members 2 can be obtained, and the rattle of the bracket 2 can be suppressed.

Further, each stopper 10 contacts the tailgate 1 in case of the tailgate 1 set in the almost vertical state, and each stopper 10 contacts the rear bumper RB in case of the tailgate 1 set in the almost horizontal state. Therefore, it is not required to prepare the stoppers 10 corresponding to the tailgate 1 set in the open state and the stoppers 10 corresponding to the tailgate 1 set in the closed state. Accordingly, the number of bracket members 2 can be reduced, and the manufacturing cost can be reduced.

Because the license plate LP can be attached to the tailgate 1, a design freedom in shaping the vehicle can be considerably improved, and the sales performance of the vehicle can be improved.

In the license plate holding bracket 2 according to this embodiment, because each stopper 10 is made of the elastic material, it is prevented that the plate holding member 4 and the license plate LP flap against the tailgate 1 or the rear bumper RB in the running of the vehicle. Thereby, the reliability and durability of the bracket members 2 can be improved, and a rattle of the bracket 2 can be suppressed.

In the license plate holding bracket 2 according to this embodiment, because each stopper 10 is made from the rubber material, a contacting portion of the tailgate 1 or the rear bumper RB contacting to each stopper 10 can be securely protected. Particularly, because the rear bumper RB is exposed to the outside of the vehicle and is directly seen, the deformation or damage of the rear bumper RB adversely affects the vehicle outside looking. That is, the vehicle appearance can be maintained by securely preventing the rear bumper RB from being worn away.

Further, in the license plate holding structure of the vehicle according to this embodiment, the receiving cavity 1a is formed in the tailgate 1. Thereby, the license plate holding bracket 2 placed close to the tailgate 1 can be nicely arranged. The bracket 2 and the license plate LP do not considerably protrude from the tailgate 1. The vehicle appearance can be maintained, and the bracket 2 is advantageous for practical use.

According to the license plate holding bracket 2 of the embodiment, because each stopper 10 is formed in the almost cylindrical shape, the relative movement of the plate holding member 4 to the tailgate 1 or the rear bumper RB can be allowed by the folding deformation of the stopper 10 in addition to the expanding and contracting deformation of the stopper 10. Accordingly, the movement of the plate holding member 4 to the tailgate 1 or the rear bumper RB can be set to a large amount.

In this embodiment, the stopper 10 is made from the rubber material formed in the almost cylindrical shape. However, the stopper 10 is not limited to the almost cylindrical shape, and it is preferable that the stopper 10 be formed in an almost semicircular shape or the like. The stopper 10 is not limited to the rubber material, and it is preferable that the stopper 10 be made from an elastic material such as urethane resin or the like. In this case, the plate holding member 4 and the license plate LP do not flap against the tailgate 1 or the rear bumper RB in the running of the vehicle.

In this embodiment, the rotational movement mechanism 5 comprises the stays 5a, the pins 5b and the grooves 5c. However, it is applicable that a hole be formed in the gate side fixing member 3 and a pin penetrating through the hole be directly arranged in the plate holding member 4.

Further, in this embodiment, the gate side fixing member 3 and the plate holding member 4 are respectively formed in the plate shape. However, it is applicable that e gate side fixing member 3 and the plate holding member be respectively formed in a rod shape. The stopper 10 contacts the tailgate 1. However, it is applicable that e stopper 10 contacts the gate side fixing member 3. The structure of each member of the bracket 2 can be appropriately changed.

The entire disclosure of Japanese Patent Applications No. Tokugan 2002-270020 filed on Sep. 17, 2002, No. Tokugan 2002-270040 filed on Sep. 17, 2002, No. Tokugan 2002-270044 filed on Sep. 17, 2002, No. Tokugan 2002-270109 filed on Sep. 17, 2002 and No. Tokugan 2002-270116 filed on Sep. 17, 2002 including specification, claims, drawings and summaries are incorporated herein by reference in its entirety.

What is claimed is:

1. A license plate holding bracket to be attached to the rear of a tailgate above a rear bumper for holding a license plate behind said tailgate for closing said cargo bed by displacement thereof in a perpendicular direction when said tailgate is in a vertical state and for opening said tailgate by positioning said tailgate in a horizontal state in order to open said cargo bed, said license plate holding bracket comprising:
   a gate side fixing member to be fixed to said tailgate;
   a plate holding member rotatably connected to said gate side fixing member for being movable from a horizontal position of said license plate to an erected folded out position thereof;
   a stopper provided on said plate holding member for contacting said rear bumper when said tailgate is approximately horizontal and when said license plate is approximately erected folded out so as to be easily noticeable from behind when said cargo bed is open and to avoid unnecessary vibrations of said license plate;

a lock mechanism for locking the gate side fixing member and the plate holding member when the license plate is in parallel with the tailgate, a rotational movement mechanism having a first end of a stay attached to the gate side fixing member for performing a reciprocal rotational movement;

a member with a groove formed along the plate holding member, a pin arranged on said side of a second end of the stay being passed through the groove; and a pin engaging member for engaging with the pin when the plate holding member is erected folded out, wherein the plate holding member is supported by the stay when the plate holding member is erected folded out, on the gate side fixing member.

2. The license plate holding bracket as claimed in claim 1, wherein:

the rotational movement mechanism has a structure for the pin being placed at the first end of the groove when the plate holding member is in parallel with the gate side fixing member and the pin being placed at the second end of the groove when the plate holding member is almost erected folded out, on the gate side fixing member and wherein the stay performs a reciprocal and rotational movement by an angle exceeding 90 degrees from a state where the plate holding member is substantially parallel to the gate side fixing member in a state where the plate holding member is erected folded out on the gate side fixing member, and wherein the second end of the groove is formed to be tilted toward a center of the rotational movement of the stay.

3. The license plate holding bracket as claimed in claim 1, further comprising:

the lock mechanism having a latch arranged in a side of the plate holding member and a striker arranged in said side of the gate side fixing member for locking the gate side fixing member and the plate holding member and detachably for engaging with the latch when the license plate is almost in parallel with the tailgate; and a biasing member for exerting a biasing force on the gate side fixing member and the plate holding member to separate these members from each other when the gate side fixing member and the plate holding member are locked by the lock mechanism.

4. The license plate holding bracket as claimed in claim 1, further comprising:

a resin member for covering a surface of the plate holding member in a side of the gate side fixing member.

5. The license plate holding bracket as claimed in claim 4, wherein:

the plate holding member has a hole therein and a hook formed in the resin member to engage with a periphery of the hole, and the resin member detachably engages with the plate holding member.

6. The license plate holding bracket as claimed in claim 4, further comprising:

a fixing member arranged to detachably engage with the plate holding member for fixing the resin member.

7. The license plate holding bracket as claimed in claim 6, wherein:

the fixing member enables contacting the tailgate when the license plate is in parallel with the tailgate.

8. The license plate holding bracket as claimed in claim 1, further comprising:

a bolt arranged in the plate holding member for passing through a holding hole formed in the license plate; and a nut for screwing to the bolt.

9. A license plate holding structure of a vehicle, comprising:

a tailgate above a rear bumper for holding a license plate behind a cargo bed of a vehicle, said tailgate for closing said cargo bed by displacement thereof in a perpendicular direction when said tailgate is in a vertical state and for opening said tailgate by positioning thereof at a horizontal state in order to open said cargo bed;

a gate side fixing member fixed to said tailgate;

a plate holding member rotatably connected to said gate side fixing member for being movable from a horizontal position of said license plate to an erected folded out position thereof; and a stopper provided on said plate holding member for contacting said rear bumper when said tailgate is approximately horizontal and when said license plate is approximately erected folded out so as to be easily noticeable from behind if said cargo bed is open and to avoid unnecessary vibrations of said license plate, wherein a receiving cavity for receiving the stopper is formed in the tailgate to face the license plate holding bracket.

* * * * *